United States Patent [19]

Brown et al.

[11] 4,320,097
[45] Mar. 16, 1982

[54] RECOVERY OF VANADIUM FROM ACIDIC SOLUTIONS THEREOF

[75] Inventors: Richard A. Brown, Trenton, N.J.; Myles Fixman; Dale L. Lesher, both of Canon City, Colo.

[73] Assignee: FMC Corporation, Philadelphia, Pa.

[21] Appl. No.: 192,131

[22] Filed: Sep. 29, 1980

[51] Int. Cl.³ .............................................. C01G 31/00
[52] U.S. Cl. .......................................... 423/63; 423/62; 75/101 BE
[58] Field of Search ............................. 423/62, 63, 64; 75/101 BE

[56] References Cited

U.S. PATENT DOCUMENTS

| | | | |
|---|---|---|---|
| 2,211,119 | 8/1940 | Hixson | 423/63 |
| 2,830,874 | 4/1958 | Long et al. | 423/63 |
| 3,190,720 | 6/1965 | Goren | 423/64 |
| 3,305,322 | 2/1967 | Henrickson | 423/67 |
| 3,734,696 | 5/1973 | Lucid et al. | 423/63 |
| 3,764,274 | 10/1973 | Lucid | 423/63 |
| 4,024,215 | 5/1977 | Caropreso et al. | 423/16 |
| 4,150,092 | 4/1979 | Pitts | 423/63 |

FOREIGN PATENT DOCUMENTS 43-21870  9/1968  Japan ................................. 423/62
46-41211 12/1971  Japan .

OTHER PUBLICATIONS

Kinetic Studies of the Reactions of Peroxy Compounds of Chromium (VI), Vanadium (V), and Titanium (IV) in Acid Media, by Mato Orhanovic and Ralph G. Wilkins, JACS 89:2, Jan. 1967, pp. 278–282.
Colorimetric Methods of Analysis by Foster Dee Snell and Cornelia T. Snell, vol. II, Nov. 1955, pp. 453–454.

*Primary Examiner*—Herbert T. Carter
*Attorney, Agent, or Firm*—Robert D. Jackson; Frank Ianno

[57] ABSTRACT

Vanadium is recovered from sulfuric acid leach liquor by oxidizing the vanadium with hydrogen peroxide in the presence of iron ions and extracting the oxidized vanadium with an amine solvent system.

6 Claims, No Drawings

RECOVERY OF VANADIUM FROM ACIDIC SOLUTIONS THEREOF

This invention relates to the recovery of vanadium from aqueous acidic solutions, particularly to an improved method of oxidizing the vanadium in said solution for recovery of the oxidized vanadium therefrom by solvent extraction.

It is well known to recover vanadium by leaching vanadium ore or other suitable vanadium bearing material with sulfuric acid to give a sulfuric acid leach liquor from which the vanadium is extracted with an organic solvent. Such leach liquors normally run about 0.5 to 20 g/l $V_2O_5$. In the preferred procedure, the vanadium is oxidized to the pentavalent state prior to solvent extraction. The oxidized vanadium values are stripped from the extractant and recovered as $V_2O_5$.

In the currently practiced commercial process of obtaining vanadium by the solvent recovery technique, sodium chlorate is used as the oxidant to form the solvent extractable pentavalent vanadium. Although generally effective, the process is objectionable in that the oxidation with sodium chlorate releases chloride ions which are extremely corrosive to metal. Consequently, plant equipment such as reaction vessels and piping must be made of corrosion resistant materials thereby adding to capital and operation costs. Moreover, sodium chloride is a pollutant which is difficult and expensive to dispose of in a manner which complies with environmental regulations.

It has been proposed to replace sodium chlorate with other oxidants. For instance, U.S. Pat. No. 3,305,322 describes the oxidation of vanadium in solution with sulfur dioxide and oxygen in the presence of ferric iron. Manganese oxide ($MnO_2$) has also been used as an oxidant to provide soluble pentavalent vanadium. For various reasons, e.g., cost, performance, environmental problems, and the like, none of the vanadium oxidant systems thus far evaluated has proven satisfactory. Consequently, sodium chlorate, despite its undesirable traits, continues to be used as the oxidant in the recovery of vanadium by solvent extraction.

One oxidant which has many desirable features and properties is hydrogen peroxide. It is non-corrosive, forms no deleterious by-products and is available in commercial quantities at reasonable costs. Moreover, hydrogen peroxide is known to be an oxidant for vanadium. Thus, in Japanese Pat. No. 46-41211, there is disclosed the oxidation of vanadium with hydrogen peroxide in an acid-leach liquor whereby the vanadium is precipitated as $V_2O_5$. However, the utilization of hydrogen peroxide in the vanadium solvent extraction process has not been reported. The silence of the prior art in this regard is not surprising in view of the reaction of hydrogen peroxide with pentavalent vanadium in acid media to form the stable and insoluble red monoperoxyvanadate, $VO_3^+$. In fact, this reaction is the basis for the colorimetric determination of vanadium, thus demonstrating the ease of formation and stability of the monoperoxyvanadate: "Kinetic Studies of the Reactions of Peroxy Compounds of Chromium (VI), Vanadium (V), and Titanium (IV) in Acid Media" by Mato Orchanovic and Ralph G. Wilkins, JACS 89:2, January 1967, pages 278–282; also "Colorimetric Methods of Analysis" by F. D. Snell and C. T. Snell, Vol. II, November, 1955, D. Van Nostrand Co., Princeton, New Jersey, pages 453–454.

In accordance with the present invention, there is provided a process for oxidizing vanadium to the +5 valence state in a sulfuric acid leach solution in which at least part of the vanadium exists in the +4 valence state comprising: contacting the leach solution with hydrogen peroxide in the presence of an effective amount of iron ions whereby the vanadium is oxidized to the +5 valence state, the hydrogen peroxide at any given time being maintained at a level not substantially exceeding the rate at which it is being consumed in the oxidation of the vanadium.

The hydrogen peroxide is employed in the form of an aqueous solution at a concentration of about 2 to 50% preferably about 20% to 30%, optimumly at about 10%. In carrying out the oxidation, the hydrogen peroxide is desirably introduced into the leach liquor at a rate substantially commensurate with the rate of oxidation. If the rate of peroxide addition is too much in advance of the oxidation, the peroxide will tend to build up in the reaction mixture and be subject to decomposition, resulting in poor oxidant utilization. Moreover, excess hydrogen peroxide, particularly when present after the oxidation is complete can react with the +5 vanadium moiety to form the insoluble red monoperoxyvanadate, $VO_3^+$, previously mentioned in the prior art discussion.

Considering hydrogen peroxide's propensity toward iron catalyzed decomposition—iron chelating agents are commonly employed as hydrogen peroxide stabilizers—and monoperoxyvanadate, $VO_3^+$ formation, the finding that a combination of iron and hydrogen peroxide can be utilized in vanadium oxidation as provided herein is indeed surprising.

The course of the vanadium oxidation is indicated by a change in color of the reaction mixture; initially, the reaction mixture is bluish, due to the preponderance of blue $VO^{+2}$ ions in the sulfuric acid leach liquor. On addition of hydrogen peroxide, the blue $VO^{+2}$ ions are oxidized to the orange $VO_2^+$ ions. As the oxidation proceeds the reaction mixture turns from blue to brownish green and finally to orange; of course, the color may be somewhat degraded or masked by the presence of other colored ions in the leach liquor. To the person skilled in the vanadium recovery art, the color change can serve as a guide for estimating the state of the oxidation. A more reliable and accurate means of following the progress of the vanadium oxidation is the solution potential as measured against a standard silver/silver chloride electrode (Ag/AgCl). Prior to the introduction of peroxide, the potential of the vanadium leach liquor is in the neighborhood of about 430 mv. As peroxide is added and oxidation commences, the potential increases, reaching a final value in the vicinity of about 650 mv, at which point oxidation of the vanadium is complete.

Vigorous agitation should be maintained during the reaction to ensure intimate contact of the peroxide with the leach liquor. This promotes rapid oxidation of the vanadium while keeping unreacted peroxide to a minimum to prevent formation of the insoluble monoperoxyvanadate, $VO_3^+$. The oxidation is run at about 25° to 30° C. at a pH of about 1.8 to 2.2; oxidation time is about 1 to 3 hours.

Since iron is commonly found in association with vanadium, acidification of vanadium bearing materials or ores with sulfuric acid produces a leach liquor containing iron as well as vanadium. Accordingly, the iron content of the leach liquor is adjusted to provide the requisite concentration of iron ions for catalyzing the hydrogen peroxide oxidation of vanadium. The concentration of iron ions is in the general range of from about 0.1 to about 20 g/l, optimumly about 7 to 11 g/l. An iron content higher than the general range causes excessive decomposition of the peroxide while less iron than the general range is ineffective.

The oxidation of vanadium with hydrogen peroxide proceeds in accordance with the following equation:

$$2VO^{++} + H_2O_2 \rightarrow 2VO_2^+ + 2H^+$$

corresponding to a theoretical consumption of 0.187 g of hydrogen peroxide per g of $V_2O_5$. However, in actual practice, about four times the theoretical quantity of peroxide is required to oxidize the vanadium. When, on the other hand the oxidation is conducted in the presence of iron ions as provided by the process of the invention, the consumption of peroxide is drastically reduced, reaching a low value of about 50% in excess of the theoretical or about ⅓ of the value under iron free conditions. So far as can be determined, the iron ions act as a catalyst interacting with the peroxide to generate free radicals which are the reactive entities that oxidize the vanadium to the +5 valence state.

The catalytic effect of iron on the peroxide oxidation of vanadium reaches a maximum when the iron content in the leach liquor is about 7 to 11 g/l. As the iron concentration of iron ions approaches about 7 g/l, the amount of peroxide in excess of the stoichiometric requirement decreases, showing the increasing catalytic activity of the iron, reaching the optimum of about 7 to 11 g/l. Above about 12 g/l of iron, more peroxide will be required due to metal catalyzed peroxide decomposition. The optimum reaction conditions are obtained by balancing the two opposite catalytic effects—catalysis of vanadium oxidation vs. iron catalysis of peroxide decomposition. Under conditions favoring maximum vanadium oxidation, e.g., 7 to 11 g/l of iron ions, the amount of hydrogen peroxide consumed is about 0.2 g per g of $V_2O_5$ oxidized. In the general range of iron ions, e.g. about 0.1 to 20 g/l, the peroxide will vary from about 0.2 g to about 0.5 g per g of $V_2O_5$ oxidized. Somewhat more effective utilization of the hydrogen peroxide is achieved at the lower concentration range of the oxidant i.e., about 10%.

After oxidation is complete as evidenced by a rise in potential to above about 660 mv and there is no further decrease of vanadium in the raffinate the oxidized vanadium is in condition for solvent recovery.

However, if excess peroxide is added to the oxidized solution prior to extraction, the raffinate will increase due to the formation of the unextractable cationic peroxy vanadate:

$$VO_2^+ + H_2O_2 \rightarrow VO_3^+ + H_2O$$

which appears as a dark red complex, particularly at low pH. The raffinate increases as the potential increases above 670 mv. The lower the solution temperature, the more likely the complex aforesaid will be formed due to less decomposition of the peroxide. As the temperature of the solution increases, the greater the rate of peroxide decomposition and the less the amount of $VO_3^+$ formed. The problem of excess peroxide can be alleviated by raising the temperature of the solution. However, this can become detrimental due to the degradation reaction. The most effective method is to insure that there is sufficient lag time between the last peroxide addition and solvent extraction and to insure that the final potential of the feed does not exceed 680-700 mv. The potential continues to rise for approximately 36 minutes after the last peroxide addition, indicating unreacted peroxide is still present.

Regarding the solution parameters necessary for effective solvent extraction of the oxidized vanadium, it is necessary to achieve a balance of pH, temperature, and solution potential. The temperature should be kept low enough to minimize the solvent degradation but high enough to maximize the equilibrium shift to the anionic vanadium species. The operating range is 25° to 50° C. The preferred range is 30° to 40° C. The pH of the feed entering the extraction circuit should be kept as high as possible without the precipitation of ferric hydroxide. Ferric hydroxide begins to precipitate from a pH of 2.0 to 2.2, depending on the iron concentration. The operating range for the pH is 1.8 to 2.2, with the ideal range being 1.95 to 2.05. The solution potential entering the extraction circuit should be >650 mv measured versus an Ag/AgCl reference. The ideal range is 670 to 680 mv. In order to insure that the peroxide is completely reacted and that all equilibria are stable, a minimum of 30 minutes should be allowed between the point of the last peroxide addition and the solvent extraction.

Reference is now made to the following non-limiting examples.

EXAMPLE 1

A sulfuric acid solution assaying 3.00 g/l $V_2O_2$ and 2.6 g/l Fe having an initial potential of 430 mv (versus Ag/AgCl) at a pH of 2.2 was oxidized with hydrogen peroxide (30 weight %) at a pH of 1.8 and temperature of 35° C. until a potential of 670 mv was reached. The oxidation was completed after two hours. After extraction with an organic solvent composed of 3% tricaprylamine, 3% tributylphosphate and 94% kerosene by volume, there remained only 0.135 g/l $V_2O_5$ in solution giving a recovery of 95.5%. The total peroxide consumption was 0.55 g $H_2O_2$/g $V_2O_5$.

EXAMPLE 2

One hundred twenty to 140 gpm of an aqueous sulfuric acid vanadium solution assaying at 4.0 g/l $V_2O_5$ and 4.0 g/l Fe was oxidized in a series of five tanks with hydrogen peroxide at a temperature of 24° to 32° C. Two to 5 g/l of 10% hydrogen peroxide was used for the oxidation. The feed had a pH of 1.6 and a potential of 430 mv prior to oxidation. Twenty percent of the peroxide was mixed with the feed to the tank. The residence time of the first three tanks was about 45 minutes and of the last two tanks, about 75 minutes. The pH was brought up in the second tank to 2.1-2.2 and the remainder of the peroxide was added to the third tank. The feed going to the solvent extraction circuit had a pH of 1.95-2.15 and potential of 660 to 690 mv. After four stages of solvent extraction with 4% of tricaprylamine and 3 to 5% tributyl phosphate in kerosene, the raffinate measured 0.25-0.45 g/l $V_2O_5$ for a 90 to 95% recovery of vanadium.

EXAMPLE 3

An aqueous sulfuric acid solution containing 6.71 g/l $V_2O_5$ and 0.4 g/l Fe was oxidized with hydrogen peroxide. The solution prior to oxidation had a pH of 1.0 and potential of 440 mv. Hydrogen peroxide (15%) was added until the solution had a potential of 660 mv. at a pH of 2.0. The oxidation was completed in one hour at a temperature of 35° C. The solution was extracted in four stages with 5% tricaprylamine and 5% isodecanol in kerosene. After extraction the vanadium in the raffinate measured 0.1 g/l. The total peroxide consumption was 0.25 g $H_2O_2/V_2O_5$ recovered.

EXAMPLE 4

An aqueous sulfuric acid solution assaying 3.98 g/l $V_2O_5$ and 6.6 g/l Fe and having a pH of 1.62 and a potential of 372 mv (vs. Ag/AgCl) was oxidized with 20% $H_2O_2$ in a series of six tanks. The first four tanks had a residence time of 12 minutes and the last two tanks had a residence time of 25 minutes. The peroxide was added in two stages and the pH adjusted after each peroxide addition. Approximately 30 to 40% of the peroxide was added to the first tank. The pH was adjusted to 1.8 in the second tank. The remainder of the peroxide was added to the third tank and the pH readjusted to 1.8 to 2.0. The oxidized solution was extracted in four stages with 3.85% of tricaprylamine and 4.0% isodecanol (by volume) in kerosene. After extraction, there was 0.3 to 0.6 g/l vanadium left in solution. Eighty-five to 92% of the vanadium was extracted. The total peroxide consumption was 0.26 g $H_2O_2$/g $V_2O_5$ oxidized.

EXAMPLE 5

The purpose of this example is to demonstrate the relationship between oxidation potential and vanadium recovery from sulfuric acid solutions of vanadium oxidized with the iron/peroxide oxidant system of the invention.

A series of sulfuric acid solutions each containing 8.5 g/l $V_2O_5$ and 8 g/l of iron was oxidized with hydrogen peroxide having a strength of 2 to 12%. Oxidation was stopped at potentials ranging from 580 to 700 mv and the solution extracted with a mixture containing by volume 5% tricaprylamine and 5% isodecanol and 90% kerosene. The results of oxidizing the vanadium solutions are summarized in Table I.

As can be seen, maximum recovery of vanadium, as evidenced by the low vanadium assay of the raffinate, was realized at an oxidation potential in the range of 670–690 mv.

EXAMPLE 6

The purpose of this example is to demonstrate the relationship between vanadium recovery and the amount of iron in the iron peroxide oxidant system of the invention.

A series of sulfuric acid solutions each containing 9.89 g/l $V_2O_5$ and varying levels of iron were oxidized with hydrogen peroxide to oxidize the vanadium to a potential of 670 mv. After oxidation was completed, the solution samples were extracted with the amine solvent of Example 5. The results of oxidizing the vanadium solution with varying amounts of iron are summarized in Table II.

As will be observed, maximum recovery of vanadium was achieved, as evidenced by the low vanadium assay in the raffinate, when the iron content of the solution was about 11 g/l. Because of the large excess (over 400% above theoretical) of peroxide required to oxidize vanadium in the absence of iron ions, even the modest reduction of the $V_2O_5$ assay to 1.09 g/l of raffinate required large amounts of iron free peroxide. As the iron content approaches the upper end of the 0.1 to 20 g/l range, metal catalyzed decomposition of the peroxide becomes apparent as shown by the increase of vanadium in the raffinate.

TABLE I

Effect of Vanadium Recovery on Oxidation Potential

| Concentration Wt. % $H_2O_2$ | Oxidation Potential mv | Raffinate g/l |
|---|---|---|
| 4.2 | 585 | 0.89 |
| 12.0 | 605 | 0.41 |
| 2.1 | 630 | 0.47 |
| 2.1 | 670 | 0.17 |
| 8.3 | 690 | 0.20 |

TABLE II

Effect of Iron Concentration on Vanadium Recovery

| Concentration Wt. % $H_2O_2$ | Fe g/l | Raffinate g/l $V_2O_5$ |
|---|---|---|
| 20 | 0 | 1.09 |
| 20 | 6 | .36 |
| 20 | 11 | .28 |
| 20 | 19 | .64 | shows that a range of 10 to 30% $H_2O_2$, raffinate varied with amount of Fe added.

We claim:

1. The process for the oxidation of vanadium in aqueous sulfuric acid leach liquors comprising treating the solution with hydrogen peroxide in the presence of an effective amount of iron ions in the range of about 0.1 to about 20 g/l, the hydrogen peroxide at a given time being maintained at a level not substantially exceeding the rate at which it is being consummed in the oxidation of the vanadium.

2. The process of claim 1 wherein the strength by weight of the hydrogen peroxide is from about 1% to about 50%.

3. The process of claim 2 wherein the amount of iron ions is about 7 to 11 g/l.

4. The process of claim 3 wherein the oxidation is carried out at about 25° to 50° C. and at a pH of about 1.8 to 2.2.

5. The process for the recovery of vanadium from sulfuric acid leach liquor in which part of the vanadium exists in the +4 valence state, comprising adding to the leach liquor in the presence of an effective amount of iron ions, in the range of about 0.1 to about 20 g/l, an aqueous hydrogen peroxide having a strength of about 1% to 50%, the rate of addition of said peroxide not substantially exceeding the rate at which it is being consummed in the oxidation whereby the vanadium is oxidized to the +5 valence state and extracting the oxidized vanadium from the leach liquor with an amine extractant.

6. The process of claim 5 wherein the oxidation is carried out at about 25° to 30° C. at a pH of about 1.8 to 2.2.

* * * * *